Jan. 18, 1927.
E. K. NORTON ET AL
1,614,849
LIQUID GAUGE
Filed May 23, 1922
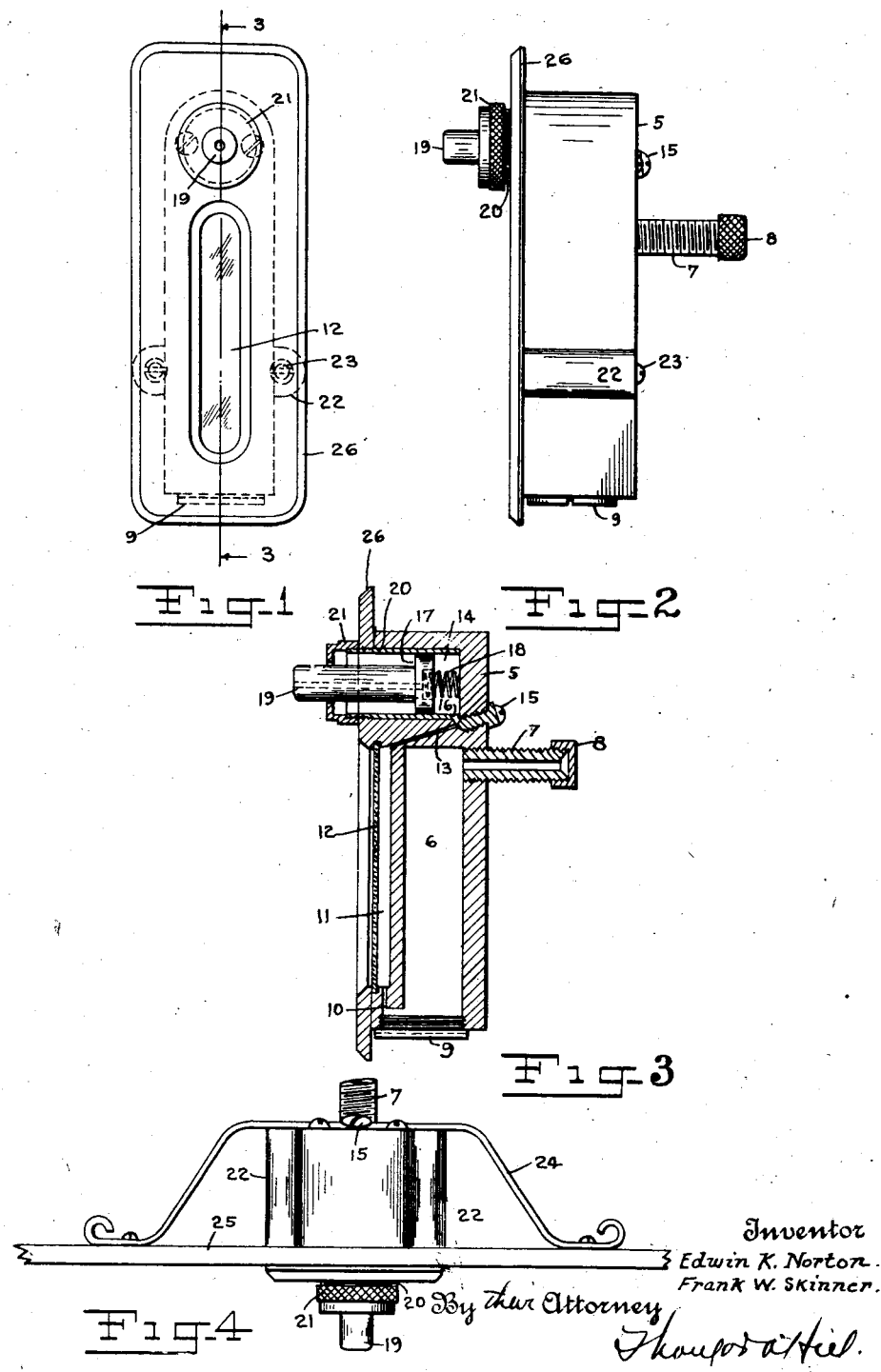
Inventor
Edwin K. Norton.
Frank W. Skinner.
By their Attorney Patented Jan. 18, 1927.

1,614,849

UNITED STATES PATENT OFFICE.

EDWIN K. NORTON, OF GREAT NECK, NEW YORK, AND FRANK W. SKINNER, OF HARRINGTON PARK, NEW JERSEY.

LIQUID GAUGE.

Application filed May 23, 1922. Serial No. 562,981.

Our invention relates to improvements in liquid gauges and more particularly has reference to a gauge adapted to indicate the level of liquid in a container, such as gasoline, and may be read at a distant point such as upon the dash board of an automobile.

In the accompanying drawings, we have illustrated in Fig. 1 in front elevation, a suitable form of gauge embodying an application of our invention. Fig. 2 is a view looking from right to left thereat. Fig. 3 is a cross section on the line 3—3 of Fig. 1, and Fig. 4 is a view looking down upon the same showing a method of attaching it to the dash of the automobile.

Referring now more particularly to Fig. 3 it will be observed that a suitable frame or casing such as 5 may be cast of metal such as brass and is provided with a chamber 6 for a suitable liquid such as disclosed in the pending patent application of Porter Ser. No. 478,542.

7 indicates a connection for a tube connecting with the fuel tank, and for convenience in shipment may be provided with a cap such as 8 for preventing the liquid of the gauge from escaping.

The chamber 6 it will be observed is closed by a plug and cap 9 at the base for cleaning, filling, repairs, etc., and the chamber 6 it will also be observed communicates through the passage 10 with the front passage 11 which is closed in front by a plate of glass such as 12. The upper part of the front passage 11 communicates by a passage 13 with the piston chamber 14, and the passage 13 may be closed during shipment by the screw such as 15, said screw also closing the passage 16 between the piston chamber 14 and the passage 13. 17 indicates a suitable piston normally projected by the compression of the spring 18 and provided with a stem or buttom 19 which upon being pressed by the finger overcomes the pressure of the spring 18 causing the air in the chamber 14 to pass through the passages 16, 13, and 11, for adjusting the gauge.

20 indicates a suitable tube within the upper part of the casing serving as a wall for the cylinder, within which the piston 17 operates, and the said tube 20 is preferably adapted at the outer end to receive the internally tapped cap 21 which serves as a guide for the piston plunger or button 19. The outside of the casing 5 may be provided with suitable enlargements or lugs 22 for receiving screws such as 23 for retaining a strap such as 24 for securing the same to a dash such as 25, or the strap 24 may be retained upon the connector 7, and the screws 23 may be sufficiently long to engage and retain the face plate 26.

It will of course be understood that the tube connecting with the connector 7 connects with another tube which projects into the gasoline tank to a point near the bottom, a feature, however, which forms no part of this invention.

Of course it will be understood that various modifications may be made in the construction and arrangement of parts without departing from the spirit of the invention as claimed.

We claim:

1. In a gauge of the class described, an outer casing having a reservoir at the back adapted to hold liquid, a reading column at the front also adapted to hold liquid but comparatively shallow from front to back as compared with its width, and a restricted passage at the bottom between said reading column and said reservoir, a valveless button pump at the top of said casing adapted when pressed to inject air down through said reading column and through said reservoir, and an outlet for said air at the back of said gauge.

2. In a gauge of the class described, an outer casing having a reservoir at the back adapted to hold liquid, a reading column at the front also adapted to hold liquid but comparatively shallow from front to back as compared with its width, and a restricted passage at the bottom between said reading column and said reservoir, a valveless button pump at the top of said casing adapted when pressed to inject air down through said reading column and into said reservoir, and an outlet for said air at the back of said gauge, and means for temporarily sealing said liquid from said pump.

In testimony whereof we hereunto affix our signatures.

EDWIN K. NORTON.
FRANK W. SKINNER.